(12) United States Patent
Bich et al.

(10) Patent No.: US 7,896,467 B2
(45) Date of Patent: Mar. 1, 2011

(54) METHOD OF INKJET PRINTING FOR USE IN POINT-OF-SALE SYSTEMS

(75) Inventors: Danilo Bich, Arnad (IT); Luigina Gino, Arnad (IT); Francesca Pescarmona, Arnad (IT); Paolo Schina, Arnad (IT)

(73) Assignee: Telecom Italia S.p.A., Milan (IT)

( * ) Notice: Subject to any disclaimer, the term of this patent is extended or adjusted under 35 U.S.C. 154(b) by 331 days.

(21) Appl. No.: 12/084,236

(22) PCT Filed: Oct. 28, 2005

(86) PCT No.: PCT/IT2005/000624

§ 371 (c)(1),
(2), (4) Date: Apr. 28, 2008

(87) PCT Pub. No.: WO2007/049311

PCT Pub. Date: May 3, 2007

(65) Prior Publication Data

US 2009/0091592 A1    Apr. 9, 2009

(51) Int. Cl.
*B41J 2/14* (2006.01)
(52) U.S. Cl. .......................................... 347/47; 347/71
(58) Field of Classification Search .................. 347/95, 347/100, 71, 49, 40, 43
See application file for complete search history.

(56) References Cited

U.S. PATENT DOCUMENTS 5,286,286 A * 2/1994 Winnik et al. ............ 106/31.15
6,527,362 B2   3/2003 Hood et al.
6,610,165 B2   8/2003 Myhill et al.

FOREIGN PATENT DOCUMENTS

| EP | 0 690 107 A2 | 1/1996 |
| EP | 0 829 357 A1 | 3/1998 |
| EP | 1 142 967 A2 | 10/2001 |
| EP | 1 306 215 A1 | 5/2003 |
| EP | 1 366 906 A1 | 12/2003 |
| WO | WO 01/39979 A1 | 6/2001 |
| WO | WO 03/097362 A2 | 11/2003 |

* cited by examiner

*Primary Examiner* — Lamson D Nguyen
(74) *Attorney, Agent, or Firm* — Venable LLP; Robert Kinberg; Steven J. Schwarz

(57) ABSTRACT

This invention relates to a method of inkjet printing, in particular for use in POS systems. In particular the printing method according to the invention is of the thermal type. In order to obtain high speed printing, for example of 15-20 lines per second when printing text on a paper medium 60-80 mm wide (for example receipts), the drops of ink ejected during the printing operation advantageously have a relatively large volume, i.e. not less than approximately 100 picoliters (pl) and preferably between 100 and 200 pl. The ink used for applications in POS systems must quickly penetrate an extensive range of paper media. This requirement is satisfied by using an ink having a surface tension of not more than approximately 35 dyne/cm (mN/m). Problems of stagnation and dripping of the ink caused by the printing conditions are overcome through the use of a nozzle plate coated with a wetting-resistant layer of silicon carbide. This coating material has proved to have non-wettability properties which do not significantly deteriorate during a printing operation over a long period of time.

20 Claims, 2 Drawing Sheets

METHOD OF INKJET PRINTING FOR USE IN POINT-OF-SALE SYSTEMS

TECHNOLOGICAL FIELD OF THE INVENTION

This invention relates to a method of inkjet printing and in particular relates to a method of printing for use in a system for issuing receipts, tickets or bank certificates at points of sale (POS) or offices.

STATE OF THE ART

In applications in the retail sales business, post offices or banks sector many types of printing devices are currently in use to issue receipts, tickets or bank cheques. These printing devices may be connected to or incorporated into terminals for lottery games, cash registers or bank validators. Systems for issuing tickets, receipts or bank cheques for commercial points of sale and/or public offices and which include printing devices will be referred to below as point of sale (POS) systems.

Printing devices for POS systems generally operate by printing data onto a continuous strip of paper originating from a roll on which the strip is wound, and subsequently cut off the printed strip in such a way as to form the receipt. The technologies most frequently used for printing receipts are the so-called dot matrix impact printing technology and inkjet technology. In the first case printing is typically effected using a printing head of the type having points which are selectively heated, and during printing the head is in writing contact with a special paper known as thermal paper. In the second case printing is effected through a printing head comprising a plurality of nozzles capable of selectively emitting drops of black or coloured ink onto the paper while the head moves alternately (forwards and backwards) and transversely with respect to the driven movement of the paper. In the case of inkjet printers of the thermal type the head uses heating elements, generally resistors, which heat the ink in order to boil it and therefore cause the ink to be expelled through the nozzles during the printing operation. The paper normally used for inkjet printing is of the ordinary type. The possibility of using ordinary paper renders inkjet technology particularly advantageous because it is relatively economical, especially when printing in black and white.

In applications for POS systems it is important that the stages associated with printing and the issue of a receipt are carried out quickly, in order to reduce user waiting times, especially in places such as supermarkets and gaming and lottery offices. The need to have high printing speeds, often combined with the need to keep the cost of printing low, means that resolutions which are not particularly high, for example between 100 and 200 dpi, are generally acceptable. Typically, also, again to keep printing costs low, the printers use black ink, although colour printers are beginning to come into widespread use, for example for the printing of logos on tickets.

In addition to this the ink used in POS applications must dry almost instantaneously because when the printing of receipts is completed the latter are immediately placed into the hands of the customer, whose fingers must not be soiled. An ink for POS printers which has a drying time of the order of 300 ms or less is known for example from patent application EP 1142967.

The operation of a printer for POS terminals must often be capable of maintaining the printing condition for long periods of time, for example for several hours or continuous printing of thousands of tickets without intervention by the operator. Continuity of operation has resulted in printers provided with high capacity reservoirs, for example containing 200 cc of ink, being developed. Various systems for supplying ink or inks (for example in the case of colour printing where inks of different colours are used) to a cartridge for an inkjet printing head are known in the state of the art. Patent application WO 2004/091918 discloses a device for simultaneously supplying inks of different colours to a colour cartridge of a printing head which comprises a container within which there is located a seat for the cartridge which has to be reloaded and at least three reservoirs for different coloured inks.

The printer may be provided with a high capacity ink reservoir on board the machine. Patent application WO 03/097362 describes an inkjet printer used at points of sale in which the service or housing position for the printing head coincides with the position in which ink is supplied to the cartridge, which is of one piece with the head. The cartridge integral with the head is supplied from a separate ink reservoir mounted on the structure of the printer, to which the structure is connected at intervals governed by measurement of the level of ink present therein.

In order to clean and protect the printing head, printers may be provided with a cleaning station (also known as a "service station") capable of removing residues of ink and located along the trajectory of the head, typically on board the machine and at one extremity of the head's travel in a resting position. The cleaning element at the cleaning station is generally a flexible rubber blade which wipes the outer surface of the head from which the ink drops are emitted. An example of a service station for the cleaning of an inkjet printing mechanism is described in U.S. Pat. No. 6,527,362.

Patent application WO 01/39979 describes a small POS inkjet printer and in particular equipment for periodically cleaning the nozzles of one or more cartridges which are moved reciprocally through the machine's printing station.

Both abrasion and deformation of the nozzle plate can occur during contact between the head and the other structures encountered in the printing operation, such as cleaning structures. The problem of the durability of the head is particularly present in the case of nozzle plates made of non-metal polymer material. Patent application EP 1306215 describes a coating layer on at least one of the upper or lower surfaces of a nozzle plate to render the head more robust. Coating materials such as silicon nitride ($Si_3N_4$), boron nitride (BN), silicon oxide ($SiO_2$), silicon carbide (SiC) and a composition known as "silicon carbon oxide" are used for this purpose.

As previously mentioned, the ink is ejected from a printing head through a nozzle (orifice) formed through a nozzle plate. The build-up of material at the nozzle may affect formation of the drop, attract dust or other micro-debris, and may also cause smearing of the ink. For this reason it may be desirable that the surface of the nozzle plate should have a low wettability (being non-wetting or anti-wetting) with respect to the fluid ejected through the nozzle.

U.S. Pat. No. 6,610,165 describes a method for coating a nozzle plate with a non-wetting Teflon (PFTE) material formed by thermal compression.

SUMMARY OF THE INVENTION

This invention relates to a method of inkjet printing, in particular for use in POS systems. In particular the method of printing according to this invention is of the thermal type.

The Applicant has noted that prolonged operation in the printing condition, such as in the case of POS applications, may result in the degradation of print quality due to partial or total obstruction of the nozzles, with the consequent loss of printing points on the paper medium ("missing dots"), or loss of direction in ejection of the drop.

The Applicant has observed that in order to obtain high speed printing, for example of 15-20 lines per second for a printing head on a paper medium 60-80 mm wide (e.g. receipts), the drops of ink ejected during the printing operation must advantageously have a relatively large volume, that is not less than approximately 100 picoliters (1 pl $=10^{-12}$ liters), and preferably between 100 and 200 pl.

Specific requirements associated with the use of POS systems, for example the possibility of reading the receipt while it is being printed in a cash register or during the validation of a cheque in a bank system, have often made it necessary to use specific paper passes across the width of the paper medium with the head horizontally positioned, that is with the rows of nozzles substantially perpendicular to the direction of the width of the paper medium (transverse motion of the head) and substantially parallel to the printing direction (feed direction for the paper medium).

The Applicant has noted that a horizontal position of the head with respect to the paper medium presents problems of ink dripping onto the electrical contacts of the head, with consequent problems of an electrical nature, such as short circuits. In particular the presence of stagnating ink which builds up over time, particularly at the bottom of the head (with respect to the printing direction), because the force of gravity causes the ink to flow, has been observed. It has been found that dripping may occur for example after 20-30 cc of ink have passed through the nozzles of the printing head, corresponding to a relatively short operating time for the printer, given that a printer for POS terminals generally uses high printing speeds and must be capable of maintaining the printing condition for a long period of time.

Although these disadvantages can in part be overcome through actions to clean the outer surface of the head (i.e., of the nozzle plate), the Applicant has noted that in the case of continuous printing it is necessary to activate cleaning actions frequently, for example through frequent passages of the head past the service station at the edge of the machine. This may however result in damage to the head due to the abrasive action between the cleaning element and the nozzle plate, and a reduction in productive potential (throughput) because cleaning time obviously detracts from printing time.

The Applicant has also found that the need for frequent cleaning of the printing head shifts the problem of dripping to the head cleaning element, typically a flexible blade. In fact, it has been found that the cleaning element has dripping problems after frequent cleaning (carried out for example every 0.1 cc of ink emitted from the nozzles) after a printing cycle corresponding to the use of a total volume of approximately 60 cc of ink. The ink dripping from the bottom of the cleaning element wets the carriage transporting the printing unit during printing, with consequent damage to the electrical contacts of the printing unit and the carriage.

If the ink drops are ejected in relatively large volumes it has been observed that the problems of the build-up of residues and/or dripping of the ink become more severe, because these phenomena occur in a relatively short time, with a consequent need for even more frequent cleaning actions.

The ink used in printing for POS systems must have the properties of quickly drying and/or quickly penetrating the paper so that the printed paper, in the case of a receipt or a lottery game ticket for example, may be immediately handed over to the customer. The Applicant has found that the requirement of having an ink offering such performance on a vast range of paper media, such as watermarked paper, cheques and preprinted tickets, is satisfied by using an ink having a surface tension of not more than approximately 35 dyne/cm (mN/m), as measured using a Krüss K12 digital tensiometer. In particular the surface tension is determined at ambient temperature by the maximum value of the force at the contact moment between the sample under test and a platinum plate (Wilhelmy plate). Preferably the surface tension of the ink is between approximately 25 and 35 dyne/cm.

The ink is preferably a black ink.

Low surface tensions (for example around 30 dyne/cm) increase the "wettability" of the ink on the surface of the nozzle plate, that is the lower the surface tension of the liquid the more the ejected drop will tend to spread over the surface, that is to form a smaller angle of contact with the surface. It has therefore been found that the use of an ink with a low surface tension combined with the need to print by emitting drops of relatively large volume has rendered the problem of wetting of the head and therefore that of dripping of the ink particularly unacceptable. If the situation is already compromised, for example if a film of ink has formed on the outer surface of the plate, it has been observed that cleaning action can encourage further spreading of the ink onto the surface of the nozzle plate instead of providing benefit.

The Applicant has considered that if the surface of the nozzle plate through which the ink drops are ejected (i.e. the ejection surface), that is the surface with which the drops come into contact, is sufficiently wetting-resistant (anti-wetting), the drops will spread to a lesser extent.

Teflon (or Teflon-like materials, $CF_x$) which is an organic material having wetting-resistant properties, has been considered for this purpose. The nozzle plate considered was a nozzle plate of nickel coated with gold. Because it was noticed that Teflon did not adhere well to gold; the upper gold surface of the nozzle plate was coated with a layer of silicon carbide (SiC) acting as an adhesive for the organic material.

In particular the silicon carbide was deposited using typical technologies for semiconductor processes, such as plasma-enhanced chemical vapour deposition (PECVD). A layer of Teflon-like material ($CF_x$) was formed through a plasma polymerisation process.

The Applicant has observed that although the Teflon-like material had satisfactory wetting-resistance properties at, the start of the printing cycle, these properties nevertheless substantially deteriorated in the course of the printing operation, for example after a printing cycle equal to the ejection of a total volume of approximately 20 cc of ink from the nozzles (i.e. the total volume of ink which passed through the nozzles in the head). In addition to this, the Teflon showed a tendency to be detached from the underlying surface, even in the case where the underlying surface was of SiC.

It was specifically when examining the wetting-resistance properties of the ejection surface for the ink drops following detachment of the Teflon layer from the ejection surface of the head that the Applicant found that the layer of SiC used as an adhesive material in fact had very satisfactory wetting-resistant properties for the purposes of this invention. Significantly, after a printing cycle equal to the ejection of approximately 20 cc of ink, this wetting-resistance property of the SiC did not deteriorate significantly, but instead remained quite constant. The lack of deterioration in the wetting-resistance property of the SiC coating is a feature that makes it possible for the head to be used for POS applications without incurring problems associated with dripping of the ink during the printing operation.

The experiments performed by the Applicant are reported in greater detail below.

The property of the wettability (or non-wettability) of the surface of the nozzle plate may be evaluated by measuring the contact angle, $\alpha$, between a drop of ink and the surface of the nozzle plate. FIG. 4 illustrates schematically the formation of a drop 23 on an upper surface 26 of a nozzle plate 28. Angle $\alpha$ corresponds substantially to the angle which the tangent 24 to the surface of the drop forms with the plane of the upper surface of the head, 26. The greater the value of $\alpha$, the more the spreading of the drop is restricted, and the drop has well-defined perimeters. In other words, the higher the value of $\alpha$, the more the drop is in contact with a less-wettable surface (for the same surface tension of the fluid forming the drop). Measurements of the contact angle were carried out at ambient temperature (22-25°) using a commercial OCA 20 static angle measuring system distributed by FKV, depositing a drop of liquid on the surface of a nozzle plate using a micropipette.

The most significant results of the experimental tests are shown in Table 1. Table 1 shows the contact angle resulting from measurements made on a drop of liquid having a volume of 0.6 µl ($6.0 \times 10^{-7}$ l) deposited on the surface of the materials indicated in the table. Two measurements of the contact angle were made for the ink—one immediately after deposition of the drop ($\alpha_0$) and a second measurement after a set of printing operations corresponding to the use of a total volume of approximately 20 cc of ink ($\alpha_1$). This set of printing operations corresponds to approximately one life cycle of a disposable head. By way of reference Table 1 also shows measurements relating to the initial contact angle ($\alpha_0$) of a drop of water, which was always 0.6 µl. A third contact angle measurement ($\alpha_2$) was made following an immersion test consisting of immersing the nozzle plate in ink for a period of seven weeks at a temperature of 65° C. The ink used in the tests had a surface tension of approximately 30 dyne/cm at 25° C. By way of reference the surface tension of $H_2O$ at 25° C. is 71.9 dyne/cm. The dependence of the contact angle on the surface tension of the fluid, for the same surface material of the nozzle plate, will be noted from the values of $\alpha_0$ shown in Table 1.

TABLE 1

| Coating material of the surface of the nozzle plate | $\alpha_0$ $H_2O$ | $\alpha_0$ Ink | $\alpha_1$ Ink | $\alpha_2$ Ink |
|---|---|---|---|---|
| Au | 80-90° | 40-50° | <25° | 30° |
| SiC | 90-100° | 50-60° | >45° | 50° |
| Teflon | 100-110° | 50-60° | * | 35°** |

*Not determinable because of detachment of the Teflon layer
**The test was interrupted after 3 weeks because of detachment of the Teflon layer.

The experimental tests show that the initial contact angle in the case of the Au-coated surface is less than that of the SiC-coated surface. Also, in the case of the Au surface, net deterioration of the non-wettability of the surface occurred, corresponding to a reduction of at least a factor of 2 in the contact angle. In the case of SiC on the other hand the contact angle remained virtually constant, or at least the reduction in the contact angle was not greater than 20-25%.

Teflon has not shown good adhesion to Au metal surfaces or SiC, the latter being used as a material to promote adhesion. However preliminary results of the immersion test ($\alpha_2$) appear to suggest that the reduction in the contact angle over time will be greater than that observed in the case of SiC.

The Applicant, has found that a wetting-resistant surface coating of silicon carbide on the upper surface of the nozzle plate ensures that the nozzle plate has stable non-wettability properties in the course of the printing operation.

Preferably the contact angle $\alpha_1$ of the wetting-resistant layer will not be less than approximately 45°.

The Applicant has observed that a surface characterised by an excessively large contact angle $\alpha_1$ may result in adhesion problems with any layers above the nozzle head, such as for example the tape sealing the nozzles which must adhere to the plate until it is first used by the end customer. Preferably the contact angle $\alpha_1$ is not greater than approximately 90°.

When a SiC coating is present on the upper surface of the nozzle plate it has been observed that the drops remain close to the holes, and as a result of transitory hydraulics following ejection, are partly drawn back within the nozzle, with consequently less ink on the surface of the nozzle plate.

The nozzle plate obtained has the advantage of reducing the number of cleaning operations necessary in order to continue the printing operation, with consequent extension of the service life of the head. Also, if the surface of the plate has a wetting-resistant SiC coating, cleaning operations have a positive effect in removing printing residues without risking deterioration of the quality of printing subsequent to that operation.

DETAILED DESCRIPTION

In the preferred embodiment of the invention the method of printing uses an inkjet printing head of the "top shooter" thermal type, that is one which emits ink drops in a direction substantially perpendicular to the ejection members. This head is manufactured using semiconductor wafers and processing technology typical of the semiconductor components industry.

Figure 1:
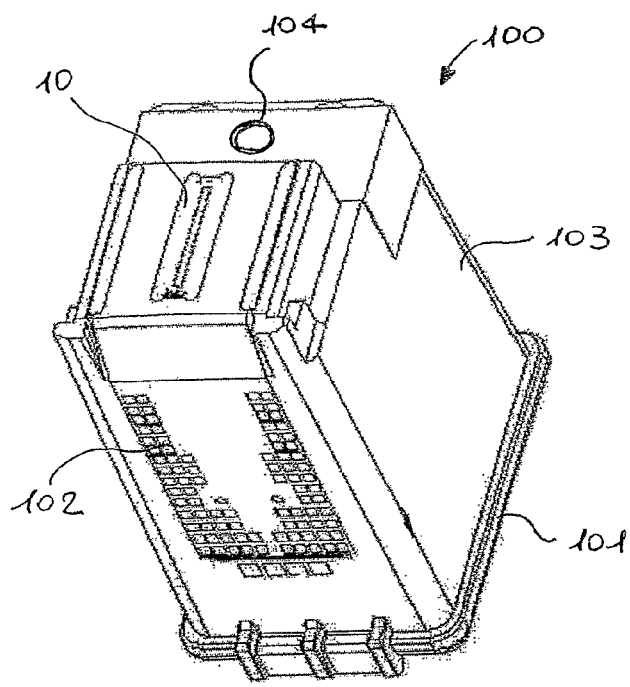
FIG. 1 shows a schematical view of a cartridge with an inkjet head used in the method of printing according to a preferred embodiment of the invention.

FIG. 1 illustrates a printing unit 100 comprising an inkjet printing head 10 according to the invention combined in one piece with an ink feed cartridge (not shown) of the rechargeable type and containing a spongy body. Printing unit 100 is provided with electrical contacts 102 to connect the cartridge to the printer (not shown). This cartridge is held in a container 103 and is closed by a lid 101. The cartridge may be supplied with ink by transferring ink from a main high capacity reservoir (not shown) through recharging hole 104. For example a main high capacity reservoir (e.g. for 300 cc of ink) may be mounted on the structure of the printer and printing unit 100 may be connected to the main reservoir in order to be recharged with ink at predetermined intervals or at intervals depending upon the level of ink determined by a sensor in accordance with known methods. For example the cartridge of the printing unit may be capable of containing up to 20 cc of ink.

Figure 2:
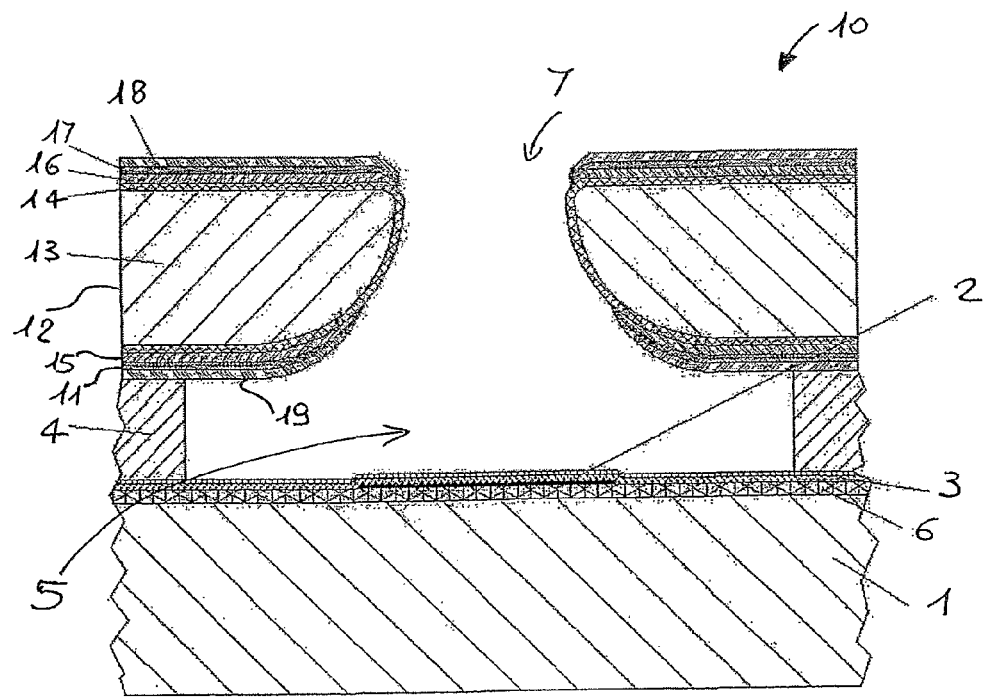
FIG. 2 is a partial schematical cross-section through a printing head according to a preferred embodiment of the invention.

FIG. 2 illustrates a partial transverse cross-section of a printing head according to a preferred embodiment of the invention. Head 10 comprises a silicon substrate 1 on which there is formed a layer of silicon oxide 6. A plurality of heating elements 2 (only one element is illustrated in FIG. 2), for example resistors of Ta/Al, are deposited on silicon oxide surface 6. A layer or a plurality of protective layers 3, for example a Ta/SiC/Si$_3$N$_4$ multilayer, covers the resistors in order to protect them.

Printing head 10 comprises a plate 12 in which are provided a plurality of nozzles 7 from which ink drops directed against the printing medium, which is generally paper (not shown), are expelled. Each nozzle 7 is positioned in relation to a chamber 5 where a bubble of vapour forms following heating of resistor 2. Nozzle plate 12 is of metal and is preferably of gilded nickel. In FIG. 2 a galvanic nickel plate (grown for example by electroforming) 13 is coated with a layer of galvanic gold 14 again obtained, for example, by electroforming. Preferably a layer of gold 15 and 16, respectively, having a thickness of some nm (for example 2-5 nm) is deposited by sputtering onto both the upper and lower surfaces of the Au/Ni plate. Preferably the surface of the galvanic layer of gold 14 is treated by sputter etching using argon gas plasma in order to clean the surface before depositing Au layers 15 and 16 by sputtering.

The metal plate is attached to a layer of photopolymer 4 in which are provided chambers 5 and conduits (not shown) through which the ink flows to the chambers from a reservoir fed by the cartridge (not shown). In order to improve the adhesion of the nozzle plate on photopolymer 4, gold layer 15 on the lower wall of the head is coated with a layer of tantalum (Ta) 11 subsequently coated with a layer of silicon carbide (SiC) 19. The SiC 19 acts as a promoter of adhesion between gold layer 15 and photopolymer 4. Intermediate Ta layer 11 is inserted to encourage adhesion between the SiC and the gold surface. Ta layer 11 is deposited on the gold surface for example by sputtering. For example a layer of 40 nm of SiC is deposited on a 30-50 nm layer of Ta.

According to the invention the injection surface of the nozzle plate, that is the surface from which the ink drops are emitted through the nozzles, is coated with a wetting-resistant SiC layer 18. Preferably wetting-resistant SiC layer 18 is not more than approximately 50 nm thick, more preferably between approximately 30 and 40 nm. Known technologies such as PECVD may be used to deposit the layer of SiC.

In the preferred embodiment of the invention illustrated in FIG. 2, wetting-resistant SiC layer 18 is deposited on a Ta layer 17 formed on the upper surface of the nozzle plate. This Ta layer encourages adhesion of the SiC, this adhesion being greater than that to a gold surface. In the embodiment in FIG. 2 the Ta layer is formed on Au layer 16 obtained by sputtering. Preferably Ta layer 17 has a thickness of 30-50 nm.

Figure 3:
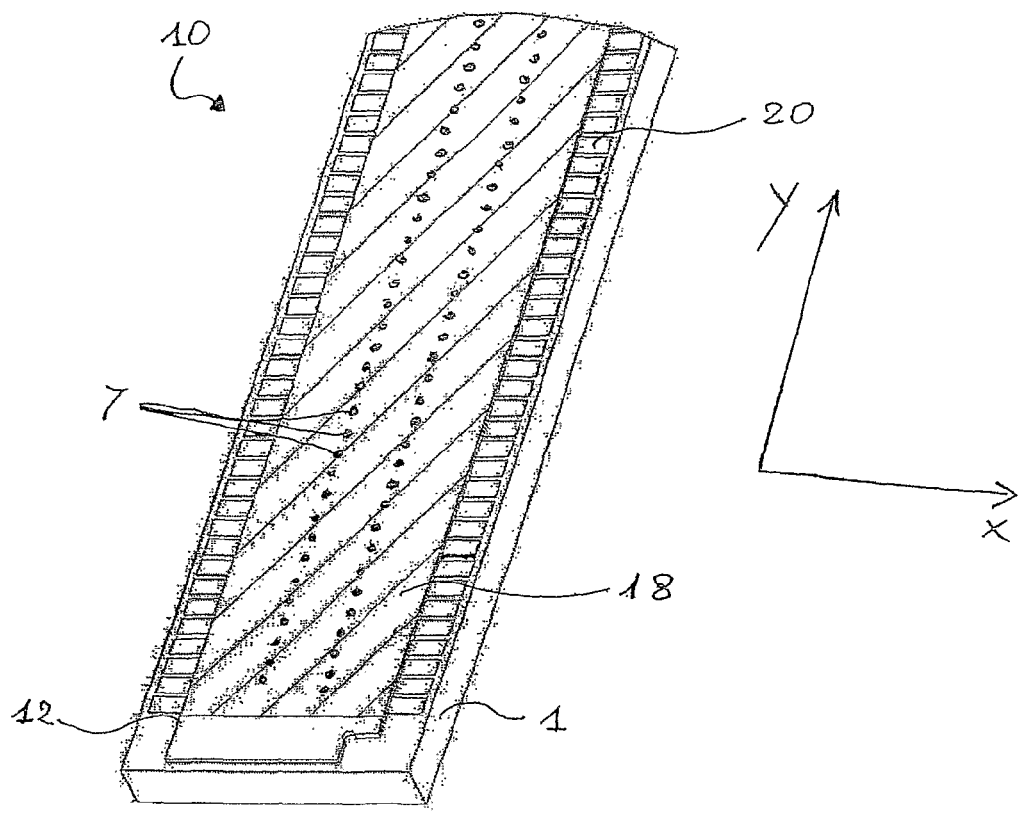
FIG. 3 shows a schematical perspective view of a printing head according to a preferred embodiment of the invention.
Figure 4:
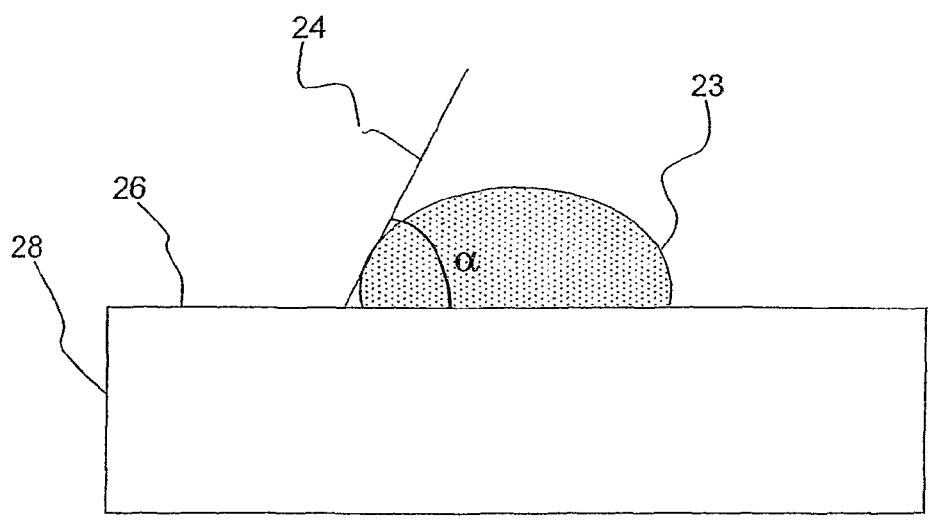
FIG. 4 is a schematical representation of the contact angle of a drop on the ejection surface of a nozzle plate.

FIG. 3 illustrates a perspective view of head 10 in which nozzle plate 12 is covered by a wetting-resistant SiC layer 18 (hatched area in FIG. 3). Preferably the SiC film is present substantially over the entire surface of the metal plate. Known masking techniques may define the area of deposition of SiC, avoiding for example deposition on electrical pads 20, to which a flexible circuit tape (not shown) will be attached by known Tape Automatic Bonding techniques.

The printing head according to the invention emits drops of ink having a volume of at least approximately 100 picoliters ($10^{-10}$ l), preferably between 100 and 200 pl. The nozzles from which these drops are emitted are preferably circular and have a diameter of preferably between 45 and 60 μm. For example the head emits drops of approximately 150 pl from nozzles 53 μm in diameter.

If the printing resolution required is not particularly great, for example between 100 and 200 dpi, the number of nozzles need not be particularly large. For example 75 nozzles are arranged in two substantially parallel rows, preferably offset by an amount equal to 1/150 of an inch. In an individual row the nozzles are arranged substantially along the direction and with a spacing of 1/75 inch. With this nozzle arrangement a resolution of 1/150 inch is obtained.

During the printing operation the printing head is caused to move substantially along the x direction, i.e. the rows of nozzles are arranged substantially perpendicular to the direction of transverse movement of the head, typically in the direction of the width of the paper medium, while the paper medium moves along y.

For example, a suitable ink composition according to the invention comprises:
  aqueous solvent: comprising water deionised to 18 Mohm, used in a percentage of approximately 80% w/w,
  humectant comprising water-soluble organic solvents as sols or as mixtures between them, such as low molecular weight glycols, glycoethers (for example diethylene glycol-monobutyl ether), 2-pyrrolidone,
  dye, such as Food Black 2 or Direct Black 168,
  biocide, such as products containing isothiazolinone compounds, and
  surfactant: a compound belonging to the family of acetylene-diol ethyoxylates in a concentration varying between 1 and 3% w/w.

The surface tension of the composition in the example described varies between approximately 32 and 35 dyne/cm.

The invention claimed is:

1. Method of inkjet printing using a head comprising a nozzle plate in which there is formed a plurality of nozzles through which ink drops are ejected, the said nozzle plate comprising an ejection surface from which the drops form; the said method comprising:
  ejecting ink drops having a volume of not less than approximately 100 picoliters, the said ink having a surface tension of not more than approximately 35 dyne/cm, wherein
  the said surface of the nozzle plate is coated by a wetting-resistant layer of silicon carbide; and
  the ink drops form a contact angle of not less than approximately 45° with the silicon-carbide-coated surface.

2. Method of printing according to claim 1, in which the silicon carbide layer has a thickness of not more than approximately 50 nm.

3. Method of printing according to claim 1, in which the nozzle plate is of metal.

4. Method of printing according to claim 3, in which the nozzle plate is of nickel coated with gold.

5. Method of printing according to claim 4, in which the upper surface of the plate is coated with a layer of gold formed by sputtering.

6. Method according to claim 3, in which an intermediate layer of tantalum is formed between the upper surface of the plate and the layer of silicon carbide.

7. Method of printing according to claim 1, in which the volume of the ink drops ejected is between 100 and 200 pl.

8. Method of printing according to claim 1, in which the surface tension of the said ink is between 25 and 35 dyne/cm.

9. Method of printing according to claim 1, in which the duration of the said ink drop ejection step is such that a total volume of at least approximately 20 cc of the said ink is ejected and in which after said ejection step the ink drops form a contact angle of not less than approximately 45° with the said silicon-carbide-coated ejection surface.

10. Method of printing according to claim 1, in which the said contact angle following the said ejection step is between approximately 45° and approximately 90°.

11. Printing unit for inkjet printing comprising:
  a printing head comprising a nozzle plate in which there is formed a plurality of nozzles from which ink drops are ejected and an ejection surface from which the drops form, and a cartridge containing ink supplied to said printing head, the said ink having a surface tension of not more than 35 dyne/cm, wherein said nozzles have an opening onto the said ejection surface of the printing head of a diameter between approximately 45 and approximately 60 μm, and wherein said ejection surface of the nozzle plate is coated with a layer of wetting-resistant material such that the ejected drops form a contact angle of between approximately 45° and approximately 90° on said wetting-resistant layer.

12. Printing unit according to claim 11, in which said layer of wetting-resistant coating comprises silicon carbide.

13. Printing unit according to claim 12, in which the layer of silicon carbide has a thickness of not more than approximately 50 nm.

14. Printing unit according to claim 11, in which the nozzle plate is of nickel coated with gold.

15. Method of inkjet printing using a head comprising a nozzle plate in which there is formed a plurality of nozzles through which ink drops are ejected, the said nozzle plate comprising an ejection surface from which the drops form; the said method comprising:

ejecting ink drops having a volume of not less than approximately 100 picoliters, the said ink having a surface tension of not more than approximately 35 dyne/cm, wherein the said surface of the nozzle plate is coated by a wetting-resistant layer of silicon carbide;

the nozzle plate is of metal; and an intermediate layer of tantalum is formed between the upper surface of the plate and the layer of silicon carbide.

16. Method of printing according to claim 15, in which the silicon carbide layer has a thickness of not more than approximately 50 nm.

17. Method of printing according to claim 15, in which the volume of the ink drops ejected is between 100 and 200 pl.

18. Method of printing according to claim 15, in which the surface tension of the said ink is between 25 and 35 dyne/cm.

19. Method of printing according to claim 15, in which the ink drops form a contact angle of not less than approximately 45° with the said silicon-carbide-coated surface.

20. Method of printing according to claim 15, in which the duration of the said ink drop ejection step is such that a total volume of at least approximately 20 cc of the said ink is ejected and in which after said ejection step the ink drops form a contact angle of not less than approximately 45° with the said silicon-carbide-coated ejection surface.

* * * * *